United States Patent [19]
Villec et al.

[11] Patent Number: 4,969,756
[45] Date of Patent: Nov. 13, 1990

[54] MOTOR DRIVEN ACTUATOR SPEED CONTROL

[75] Inventors: George N. Villec, Ann Arbor; Allen J. Walenty, Utica, both of Mich.

[73] Assignee: General Motors Corporation, Detroit, Mich.

[21] Appl. No.: 495,881

[22] Filed: Mar. 19, 1990

[51] Int. Cl.$^5$ ............................ B60T 8/42; G05F 1/10
[52] U.S. Cl. .................................... 388/815; 318/127; 318/272; 318/481; 303/3; 303/115; 303/DIG. 4
[58] Field of Search ............... 318/120, 126, 127, 129, 318/130, 134, 264, 272, 275, 281, 283, 284, 443, 481, 484, 519, 558; 388/806, 815, 821, 822, 823, 848, 853, 854; 303/3, 61, 62, 91, 92, 100, 101, 103, 113, 114, 115, DIG. 4; 180/197

[56] References Cited
U.S. PATENT DOCUMENTS 4,494,624 1/1985 Scheuerle et al. ................ 180/308

Primary Examiner—Bentsu Ro
Attorney, Agent, or Firm—Howard N. Conkey

[57] ABSTRACT

Controlled movement of a motor driven pressure modulator is provided by commanding maximum current to the motor by application of system voltage resulting in the motor current initially rising rapidly to the motor stall current. The motor accelerates at a rate that is a function of the difference between the motor torque and the load torque represented by the load on the modulator. As the motor speed increases, the motor current decreases. When the motor current decreases below the stall current by a predetermined amount representing a predetermined speed of the motor, the motor current is turned off for a wait period that is based upon the time that it took for the motor speed to attain the predetermined speed. Thereafter, maximum motor current is again commanded and the cycle repeated to provide for motor speed control.

8 Claims, 3 Drawing Sheets

4,969,756

MOTOR DRIVEN ACTUATOR SPEED CONTROL

BACKGROUND OF THE INVENTION

This invention relates to a motor control system for a motor driven pressure modulator and particularly to such a system wherein the torque of the motor is controlled to limit the speed of the motor.

The use of motor driven pressure modulators is known. For example, such uses include a motor driven braking pressure modulator in vehicle anti-lock braking systems. In these systems, during anti-lock controlled braking a DC torque motor drives a piston in a cylinder whose volume is modulated to control the hydraulic pressure at the wheel brake. In one such system, the motor is controlled to position the piston in an initial, fully extended home position at which a check valve is unseated to couple the brake system master cylinder to the wheel brake to allow normal braking. When anti-lock brake pressure modulation is required, the motor retracts the piston (which allows the check valve to close to isolate the master cylinder from the wheel brake as long as the wheel brake pressure is greater than the master cylinder pressure) to reduce brake pressure and thereafter modulates the piston position to provide pressure control for anti-lock braking. When anti-lock braking is no longer required, the motor returns the piston to its extended home position. While controlling the pressure, there is a direct relationship between the motor current, motor torque and the hydraulic pressure acting on the head of the piston.

It is desirable to control the speed of the motor in a motor driven pressure modulator such as described above. For example, it is desirable to limit the speed at which the motor repositions the piston to the extended home position such as upon termination of anti-lock controlled braking so as to prevent damage to the modulator when the piston head reaches its end of travel. However, an unknown speed dependent factor when rehoming the piston is the brake pressure on the head of the piston.

When rehoming the piston to its extended position at the termination of anti-lock braking, the pressure at the piston head is established by the vehicle operator via the normal brake system and may vary from no pressure to a relatively high braking pressure. Therefore, the speed of the motor for a given motor current command may vary widely. For example, when the motor load (i.e., the operator applied hydraulic brake pressure on the piston head) is equal to the motor torque, the motor does not rotate and the piston remains stationary. Conversely, when the load on the motor is small compared to the motor torque, the motor rotates at a high rate and the piston travels at a high speed. Therefore, care must be taken in the control of a motor driven pressure modulator to avoid situations in which the actual wheel brake pressure is substantially lower than the motor torque being commanded. When such a condition exists, motor torque must be controlled so as to prevent damage to the actuator when it reaches its end of travel.

SUMMARY OF THE INVENTION

The general object of this invention is to provide for a method and system for controlling the speed of a motor driven pressure modulator.

It is another object of this invention to provide for the control of the speed of a motor driven pressure modulator that adapts to varying modulator load conditions.

In one aspect of the invention, the motor current is controlled as a function of the load on the motor driven pressure modulator as represented by the acceleration of the modulator motor in response to motor stall current being commanded to the motor. The stall current command results in system voltage being applied to the motor.

In yet another aspect of the invention, acceleration of the motor is represented by the time for the motor current to decrease to a predetermined level below stall current when system voltage is applied to the motor.

In still another aspect of the invention, system voltage is applied to the motor of the motor driven pressure modulator for a load dependent time period varying in direct proportion to load and then terminated for a load dependent wait period varying in inverse proportion to load. In one form of the invention, the load dependent time period for applying system voltage is represented by the time for the motor current to decrease from the motor stall current to a predetermined level below the stall current.

In one form of the invention, the wait period and the voltage application period comprise a control cycle that is repeated. In one aspect of the invention, the time of the control cycle is a constant.

In summary of the operation of the preferred embodiment, when a controlled movement of a motor driven pressure modulator is desired, maximum current is commanded to the motor by application of system voltage resulting in the motor current initially rising rapidly to the motor stall current, which is a function of the motor resistance and applied voltage. Assuming that the motor torque (which is a function of the motor current torque relationship) is greater than the motor load torque, the motor accelerates at a rate that is a function of the difference between the motor torque and the load torque represented by the load on the modulator. In the case of a motor driven piston pressure modulator, the load is represented by the pressure on the piston head. As the motor accelerates and the motor speed increases, the back EMF of the motor increases resulting in the motor current decreasing. The acceleration of the motor and therefor the rate of decrease of motor current is a function of the difference between the motor torque and the load torque. When the motor current decreases below the stall current by a predetermined amount representing a predetermined speed of the motor, the motor current is turned off for a period of time referred to as a wait period that is based upon the time that it took for the motor speed to attain the predetermined speed. In one embodiment, the sum of the time that the motor current was applied and the wait period is equal to a constant interval. After the end of the interval, maximum motor current is again commanded and the cycle repeated to provide for motor speed control.

As can be seen, under high load conditions whereat the motor acceleration is low, the time for the motor to achieve the predetermined speed is greater resulting in a short wait time. If the motor loading is such that the motor speed never attains the predetermined speed, motor current is applied to the motor continuously for the whole interval. The result of the foregoing, is the control of the motor which is adaptable to the motor load to control the motor speed.

DESCRIPTION OF THE DRAWINGS

The invention may be best understood by reference to the following description of the preferred embodiment of the invention and the drawings in which.

DESCRIPTION OF THE PREFERRED EMBODIMENT

Figure 1:
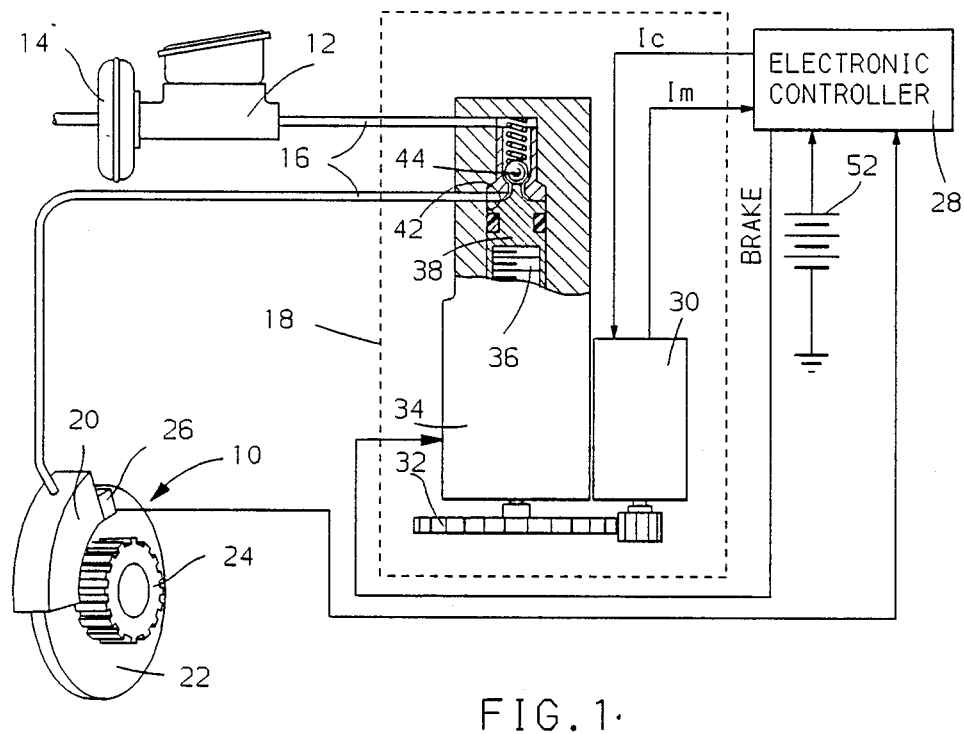
FIG. 1 is a diagram of a wheel braking system including a motor driven pressure modulator for limiting the wheel brake pressure for anti-lock brake control.

A wheel lock control system for a wheel of a motor vehicle is illustrated in FIG. 1. In general, the wheel includes a brake unit 10 operated by hydraulic pressure provided by a master cylinder 12 and a hydraulic boost unit 14 operated by the vehicle operator. The hydraulic fluid under pressure from the master cylinder 12 is provided to the brake unit 10 via brake lines 16 and a pressure modulator 18. The brake unit 10 is illustrated as a disc brake system that includes a caliper 20 located at a rotor 22. The wheel includes a wheel speed sensing assembly comprised of an exciter ring 24 rotated with the wheel and an electromagnetic sensor 26 which monitors the rotation of the exciter ring to provide a signal having a frequency proportional to the speed of the wheel. The wheel speed signal from the sensor 26 is provided to an electronic controller 28.

The pressure modulator 18 is controlled by the electronic controller 28 to limit the brake pressure applied to the wheel brake assembly 10 to prevent wheel lock-up. The modulator 18 is illustrated in an inactive position wherein it is transparent to the braking system. This is the modulator home position during normal vehicle braking. In general, when the controller 28 senses a braking condition whereat the wheel is approaching an incipient wheel lock, the pressure modulator 18 is controlled to regulate the braking pressure to the wheel to maintain the braking of the wheel in a stable braking region.

The pressure modulator 18 includes a DC torque motor 30 whose output shaft drives a gear train 32 which, in turn, rotates a linear ball screw actuator 34. The ball screw actuator, contains a linearly stationary ball screw which, when rotated, linearly positions a nut 36. The nut 36 terminates in a piston 38 such that as the linear ball screw rotates, the piston 38 is either extended or retracted depending upon the direction of rotation of the torque motor 30.

The modulator 20 includes a housing 40 in which a cylinder 42 is formed. The piston 38 is reciprocally received within the cylinder 42. The cylinder 42 forms a portion of the fluid path between the master cylinder 12 and the wheel brake unit 10. Included within this fluid path is normally closed ball check valve 44 which, when closed, isolates the master cylinder 12 from the wheel brake unit 10. The ball check valve 44 is operated to an open position by the piston 38 when positioned in an extended position within the cylinder 42 as illustrated in FIG. 1. This position is the home position of the modulator 18.

When the ball check valve 44 is opened, fluid communication is provided between the master cylinder 12 and the wheel brake unit 10. This position is the normal inactive position of the pressure modulator 18 so that normal braking of the wheel of the vehicle is provided upon actuation of the brakes by the vehicle operator. However, when the torque motor 30 is operated by the electronic controller 28 to modulate the braking pressure in the wheel brake unit 10, the piston 38 is retracted, allowing the ball check valve to seat and isolate the master cylinder 12 from the wheel brake unit 10 as long as the pressure in the cylinder 42 is less than the pressure from the master cylinder 12. Further retraction of the piston 38 functions to increase the volume in the cylinder 42 thereby decreasing the pressure applied to the wheel brake unit 10. By controlling the DC torque motor 30, the pressure at the wheel brake can therefore be modulated to controlled values less than the master cylinder 12 pressure output until such time that the piston 38 again unseats the ball check valve 44 or until the pressure generated by the pressure modulator at the wheel brake unit 10 exceeds the fluid pressure output of the master cylinder 12. When this latter condition exists, the ball check valve 44 is opened by the differential fluid pressure which limits the pressure of the wheel brake unit 10 at the master cylinder 12 pressure. In this manner, the wheel cylinder pressure can never exceed the operator established pressure.

The pressure modulator 18 further includes a normally applied spring loaded electromagnetic brake that is controlled by the controller 28 to inhibit or allow movement of the piston 38. When de-energized, the brake inhibits movement of the ball screw actuator 34 and therefore the piston 38 and motor 30. The brake is released to permit movement of the piston 38 when energized by the controller 28. For example, the electromagnetic brake may be de-energized by the controller 28 during normal wheel braking when the piston 38 is in its home position to prevent the hydraulic brake pressure on the head of the piston 38 from backdriving the modulator 18. The electromagnetic brake may take the form illustrated in the U.S. patent application Ser. No. 07/352,971 filed on May 17, 1989 and which is assigned to the assignee of this invention.

The anti-lock control system of FIG. 1 is operative at all times while the vehicle is in operation. It is necessary for normal vehicle braking via the master cylinder 12 for the modulator 18 to be in the home position, illustrated in FIG. 1, wherein the ball check valve 44 is held open. When so positioned, when the vehicle operator applies the vehicle brakes, the pressure modulator is in the passive or transparent mode so that they hydraulic fluid passes through the brake line 16 and the check valve 44 into the wheel brake caliper 20 thereby providing normal rear wheel braking.

However, when the electronic controller 28 determines that the conditions of the wheel represents an incipient wheel lock-up condition, the controller 28 commands the torque motor 30 to reverse the ball screw actuator 34 thereby causing the piston 38 to retract and the ball check valve 44 to seat thereby isolating the master cylinder 12 from the wheel brake unit 10. Thereafter, the position of the piston 38 is modulated via the control of the torque motor 30 to control the braking pressure at the brake unit 10 to maintain the braking of the wheel in a stable braking region.

When anti-lock braking is no longer required, it is necessary for the electronic controller 28 to rehome the modulator 18 to again position the piston 38 to open the check valve 44 and allow normal vehicle braking. Accordingly, and as will be described, a rehome routine is executed to reposition the piston 38 in the fully extended position as illustrated in FIG. 1 upon termination of anti-lock braking.

In operation of the pressure modulator 18, it can be seen that the load on the DC torque motor 30 is an unknown variable dependent upon the hydraulic pressure at the head of the piston 38. This pressure may vary widely depending upon the anti-lock wheel braking conditions and the pressure applied by the vehicle operator via the master cylinder 12. Particularly, at the end of anti-lock braking when the piston 38 is rehomed, the pressure output of the master cylinder 12 may be any operator established value from zero to high pressure values. Accordingly, the load on the DC torque motor established by the hydraulic pressure at the head of the piston 38 varies widely. Since the motor load is unknown, it is necessary to apply a large current to the torque motor 30 to assure adequate torque for rehoming the piston 38 against a relatively high brake pressure output of the master cylinder 12. However, if low or no pressure is being applied via the master cylinder 12, the high torque resulting from the high current provided to the torque motor 30 results in the piston being moved at high speed toward the home position. If the piston speed is not limited, damage may result to the unit when the piston reaches its end of travel at the home position. Accordingly, this invention provides for controlling the speed of the torque motor 30 and therefore the movement of the piston 38 during the rehoming of the piston 38 by controlling the current applied to the torque motor 30 in a manner adaptable to the load on the torque motor 30 established by the hydraulic pressure on the head of the piston 38.

Figure 2:
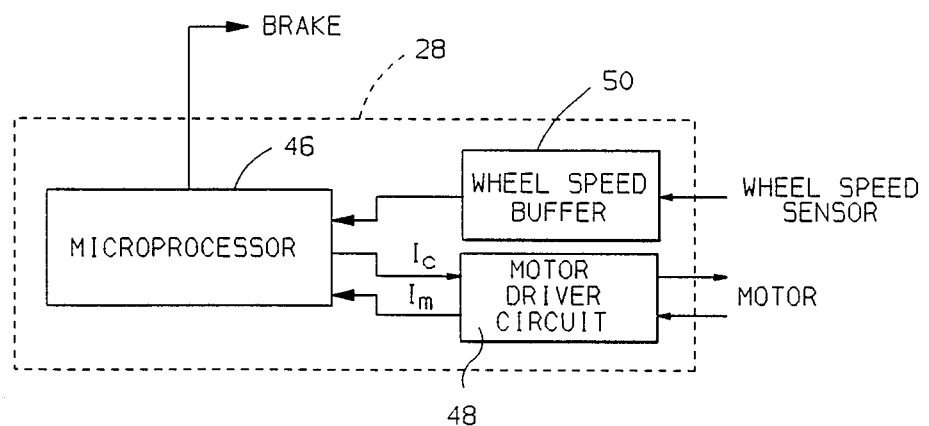
FIG. 2 is a diagram of the electronic controller of FIG. 1 for controlling the current to the motor of the motor driven pressure modulator of FIG. 1.

Referring to FIG. 2, the electronic controller 28 of FIG. 1 is illustrated and generally takes the form of a digital computer based controller. The controller includes a microprocessor 46 that is standard in form and includes the standard elements such as a central processing unit which executes an operating program permanently stored in a read-only memory and which stores tables and constants utilized in controlling the modulator 18, an analog-to-digital converter, a random-access memory into which data may be temporary stored and from which data may be read at various address locations determined in accord with the program stored in the read only memory, input/output circuitry utilized to provide a motor current controls signal $I_c$ to a motor driver circuit 48 and provide a control signal to the electromagnetic brake of the modulator 20. The input/output circuit further includes input ports for receiving the wheel speed signal from the output of a wheel speed buffer circuit 50 having an input.

The motor driver circuit 48 is of conventional form and may include a digital-to-analog converter for providing an analog signal having a value representing the output current command $I_c$. The circuit further provides closed loop adjustment of the motor current to the commanded current value $I_c$. To provide closed loop control of motor current, a current sensing resistor may be provided for monitoring the actual motor current $I_m$. The actual motor current is also provided to the analog-to-digital converter in the microprocessor 46.

The microprocessor 46 may take the form of the Motorola Single Chip Microcomputer MC68HC11. The motor driver circuit 48 may take the form of any closed loop control circuit including proportional and or integral terms for establishing the commanded motor current in the DC torque motor 30. Similarly, the wheel speed buffer circuit 50 may take the form of any conventional circuit for providing square wave signals having a frequency equal to the frequency of the wheel speed signal provided by the sensor 26.

Figure 3:
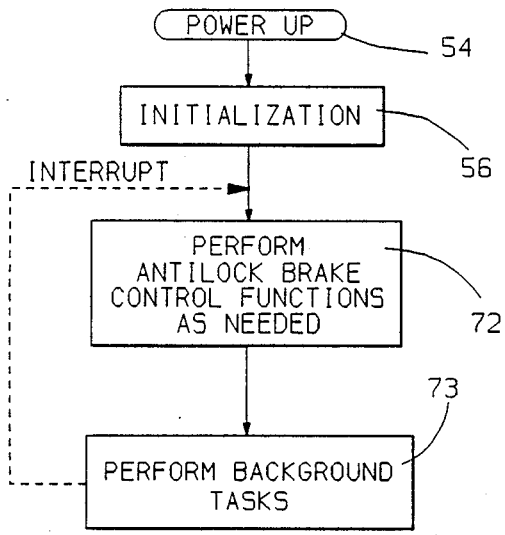
FIGS. 3-5 are flow diagrams illustrating the operation of the electronic controller of FIG. 1 for controlling the current to the motor in accord with the principles of this invention.
Figure 4:
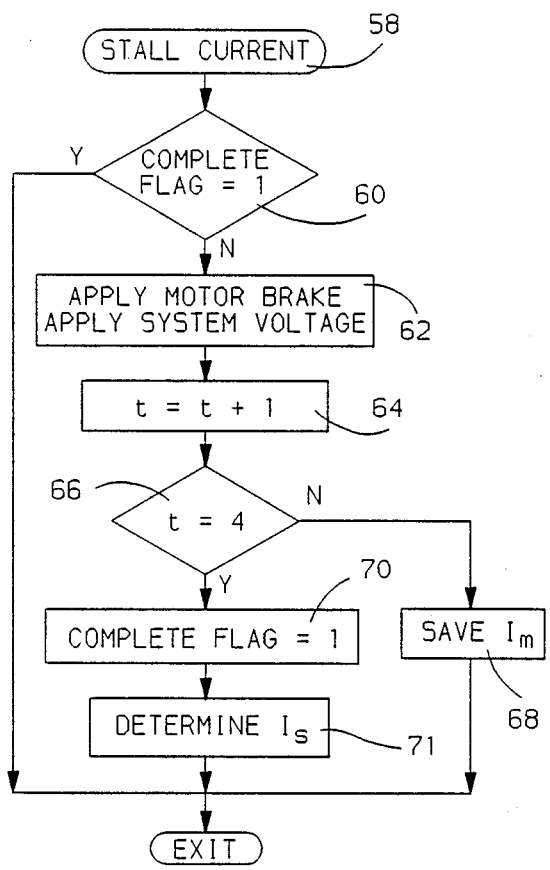
Figure 5:
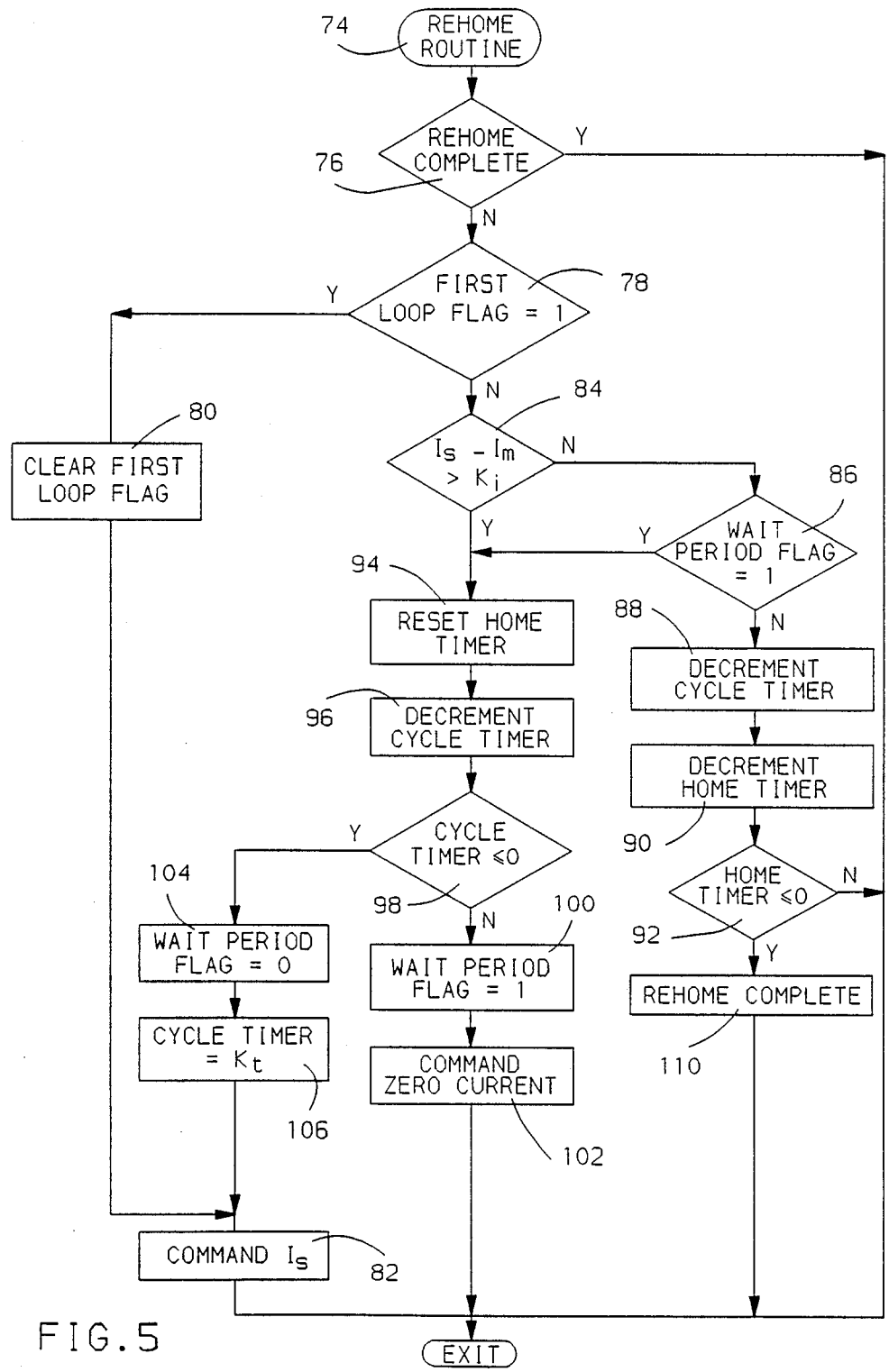

The operation of the electronic controller 28 in controlling the DC torque motor 30 in accord with this invention is illustrated in FIGS. 3–5. The read-only memory of the microprocessor 46 contains the instructions necessary to implement the algorithm as diagrammed in those figures.

Referring first to FIG. 3, when power is first applied to the system from a vehicle battery 52 such as when a conventional vehicle ignition switch (not illustrated) is rotated to its on position, the computer program is initiated at point 54 and then provides for system initialization at step 56. During the initialization procedure 56, the stall current $I_s$ of the DC torque motor 30 is measured as illustrated in FIG. 4. This routine is entered at point 58 and proceeds to a step 60 at which a complete flag is sampled. A set condition of this flag indicates that the motor stall current has been identified. If reset, indicating that the stall current has not yet been determined, the program proceeds to a step 62 where the motor electromagnetic brake is deenergized to apply the brake to prevent rotation of the torque motor 30 and system voltage (such as the battery 52 voltage) is applied to the DC motor 30 by commanding a high current value. The motor current then begins to quickly increase to the motor stall current which is determined by the motor resistance and the system voltage.

At step 64, a counter is incremented after which the state of the counter is compared to a predetermined count, such as four, at step 66. If not equal to this count, the program proceeds to a step 68 where the motor current $I_m$ is read and saved. The routine of FIG. 4 is thereafter again re-entered on a time interrupt basis and repeated until such time that step 66 determines that four samples of the motor current have been monitored and stored. At this point, the complete flag is set at step 70 after which the stall current $I_s$ of the motor 30 is determined at step 71. In one embodiment, the stall current may simply comprise the last saved value of motor current at step 68 and in another embodiment, may comprise an average of the four motor currents saved at step 68. The result of step 71 is a measurement of the stall current $I_s$ of the motor 30. Thereafter, the routine of FIG. 4 is bypassed via step 60 in response to the set condition of the complete flag.

When the initialization routine, which may include various other routines, is completed, the program then proceeds to a step 72 where the anti-lock brake control routine is performed to provide anti-lock brake control functions as required. This routine is conventional and may include the sensing of the wheel speed conditions to determine whether or not an incipient wheel lock-up condition exists. If sensed, the torque motor 30 is then controlled to retract the piston 38 to reduce the pressure to arrest the incipient wheel lock-up condition after which the pressure is modulated to maintain stable braking. Further, this routine provides for rehoming the modulator 18 to position the piston 38 in its fully extended position following anti-lock controlled braking to again condition the braking system for normal braking. The rehome function provides for a controlled speed of the DC torque motor 30 to prevent damage to the modulator 18 when the piston reaches its end of travel.

Following the step 72, the program proceeds to perform background tasks at step 73. These tasks may include other vehicle functions and also diagnostic routines. The steps 72 and 73 are repeated at constant time intervals. This is provided by the microprocessor 46 of FIG. 2 generating a time interrupt at repeated intervals such as 5 milliseconds. Upon the generation of this interrupt, the routines 58 and 60 are repeated.

Referring to FIG. 5, there is illustrated the rehome routine executed at the end of anti-lock controlled braking to reposition the piston 38 of FIG. 1 to condition the system for normal braking and for subsequent anti-lock controlled braking. In one embodiment, the rehome routine of FIG. 5 may also be executed during the initialization routine 56 or when the vehicle speed first exceeds a predetermined low threshold when the vehicle is first operated. This then assures that when the system is first powered-up, the piston 38 is initialized to its home position.

In general, the routine of FIG. 5 provides for the control of the DC torque motor 12 to move the piston 38 to its home position at a controlled speed. To adapt the torque output of the torque motor 30 to its load as established by the hydraulic pressure on the head of the piston 38, the rehome routine commands the stall current $I_s$ resulting in the application of system voltage to the DC torque motor 30. The current through the torque motor 30 rapidly rises to the stall current level since the motor is initially at rest and due to the motor-/actuator time constant. The motor speed then begins to increase from zero at a rate that is a function of the difference between the torque output of the DC motor 30 and its load established by the brake pressure at the piston 38 head. As the motor speed increases, the counter EMF of the motor increases, thereby decreasing the motor current. The acceleration of the motor 30 and therefore the rate of decrease of the motor current is a function of the difference between the motor torque and the load on the motor represented by the hydraulic pressure at the head of the piston 38. Stall current is continually commanded with the resulting full system voltage applied to the motor 30 until the motor current decreases below the stall current by a predetermined amount representing a predetermined motor speed. In this embodiment, the predetermined amount is a calibration constant $K_i$ stored in the read-only memory of the microprocessor 46. The time required for the motor current to decrease to this level is a direct function of the acceleration of the motor and therefore a direct function of the load on the motor 30. When the motor current decreases from the stall current by the predetermined amount, the motor current command is set to zero for a wait time that is inversely proportional to the time required for the motor current to decrease the predetermined amount $K_i$ below the stall current $I_s$. Accordingly, as the time required for the motor to accelerate to the predetermined speed increases, the wait time during which zero motor current is commanded decreases. In the preferred embodiment, the sum of the two times (time of application of motor current+wait time) is a constant cycle period. Upon termination of the wait time, the routine is repeated until such time as the routine determines that the piston 38 has been rehomed.

The rehome routine is entered at step 74 and proceeds to a step 76 to determine whether or not the rehome routine has been completed. If not, the condition of a first loop flag is sampled at 78. This flag is utilized to assure that motor stall current is commanded for the interval required for the motor current to increase to the stall current. In this embodiment, the time of one interrupt interval is adequate to assure the motor current reaches this level. Assuming that the first loop flag is set indicating that the rehome routine is being executed for the first time to rehome the actuator 18, the program proceeds to a step 80 where the first loop flag is cleared after which the stall current $I_s$ identified in the routine of FIG. 4 is commanded at step 82. Thereafter, the program exits the rehome routine.

As previously indicated, in this embodiment, the time required for the motor current to achieve substantially the stall current is less than the interrupt time interval so that the next time the rehome routine of FIG. 5 is executed, the motor current had reached the stall current value. Returning to step 78, if the first loop flag is reset indicating that the motor current had previously reached the stall current, the program executes a series of steps which times the first portion of the motor current control cycle during which stall current is commanded and determines if the rehome procedure has been completed. This series of steps begins at step 84 to determine whether the speed of the motor 30 represented by the drop in motor current from the stall current is greater than a predetermined value corresponding to a decrease $K_i$ in the motor current from the stall current $I_s$. In one embodiment, $K_i$ may be a calibration constant representing a predetermined motor speed condition. In other embodiments, $K_i$ may be adjusted to provide for a variable speed control of the torque motor 30.

If the current has not decreased below the stall current $I_s$ by the amount $K_i$, the program proceeds to a step 86 where a wait period flag is sampled. This flag is initially reset during the initialization routine 56 of FIG. 3 and is set, as will be described, when the motor current first decreases from the stall motor current by the amount $K_i$. Assuming that this condition has not yet been met, the program then proceeds to step 88 where a cycle timer is decremented. The initial count of the cycle timer is initially established at a calibration constant value $K_t$ which represents the time of the motor current control cycle.

At step 90 a home timer is decremented. The initial value of the home timer represents a maximum time required for the motor to rehome under all motor load conditions while the motor current command is equal to the stall current. Thereafter, the home timer is compared with zero at step 92 to determine whether or not the home routine is complete. If the home timer has not expired, the program exits the routine. The foregoing steps 84–92 are repeated as long as the motor current remains greater than the stall current $I_s$ less $K_i$.

When the difference between the stall current $I_s$ and the motor current $I_m$ becomes greater than $K_i$, the remainder of the cycle time $K_t$ comprises the wait time during which the motor current is set to zero. The next series of steps provides for this motor current control for the wait time. When the motor speed increases to a speed at which the difference between the decreasing motor current $I_m$ and the stall current $I_s$ is greater than $K_i$, the program proceeds from step 84 to a step 94 where the home timer previously described in regard to step 90 is reset to its initial value. This step forces the routine via steps 84–92 to time the rehome timer at motor current values greater than $I_s-K_i$. Thereafter, the cycle timer that is timing the motor control cycle is decremented at step 96. If step 98 determines the cycle timer count is greater than zero, the wait period flag is set at step 100 after which the motor current commanded is set to zero at step 102. The steps 94-102 are repeated as long as $I_s-I_m$ is greater than $K_i$ and until the expiration of the wait time corresponding to the expiration of the cycle time. This condition is sensed at step 98 after which a new motor current control cycle is initiated by resetting the wait period flag at step 104 and initializing the cycle timer to the initial value $K_t$ at step 106. Thereafter, the current commanded is set at the stall current value $I_s$ at step 82 and the aforementioned motor current control cycle is repeated.

As can be seen, the average motor torque is established at a level that is adaptive to the load on the head of the piston 38 to control the rehome motor speed. For higher load conditions resulting in lower acceleration rates of the motor 30, the maximum stall current $I_s$ is commanded for greater periods of time with a resulting decrease in the wait time during which zero current is commanded. If the motor load is such that the motor speed never increases to the value corresponding to the current drop $K_i$ from the stall current $I_s$, maximum current will continuously be commanded to the motor 34 resulting in continuous application of system voltage to the motor 30. When this condition exists or when the piston reaches the end of its travel resulting in the motor current rising to the stall current, the rehome routine of FIG. 5 will repeatedly proceed from step 84 through the steps 86 through 92 until such time that the home timer expires, as sensed at step 92, indicating that the rehoming of the actuator 18 is complete. Thereafter, at step 110, the rehome complete flag is set. Subsequent executions of the rehome routine results in the rehome steps being bypassed via step 76.

The foregoing routine may provide for variable speed control of the torque motor 30. For example, the value of $K_i$ may be made a variable and controlled to varying levels to adjust the average motor torque output. Similarly, the total control cycle time $K_t$ may be adjusted so as to increase or decrease the rest period provided during each of the motor control cycles. Each of these variables may be controlled to provide for controlled speed of the torque motor 30. In all cases, the control adapts to the variable load on the torque motor 30.

The foregoing description of a preferred embodiment of the invention for purposes of illustrating the invention, is not to be considered as limiting or restricting the invention since many modifications may be made by the exercise of skill in the art without departing from the scope of the invention.

The embodiments of the invention in which an exclusive property or privilege is claimed are defined as follows:

1. A method of controlling the speed of a DC motor in a pressure modulator having a variable load, the method comprising the steps of:
   applying a voltage to the motor, the motor current increasing to above a predetermined value and thereafter decreasing as motor speed increases;
   sensing the motor current;
   terminating the applied voltage to the motor for a wait period after the sensed motor current decreases to the predetermined value, the time from applying the voltage to terminating the applied voltage comprising a voltage application period; and
   cyclically repeating the steps of applying, sensing and terminating.

2. The method of claim 1 wherein the wait period is varied in an inverse relationship to the voltage application period.

3. The method of claim 1 further including the step of determining the motor stall current and wherein the predetermined value is a predetermined current offset below the determined stall current.

4. The method of claim 1 wherein the sum of the voltage application period and the wait period is a predetermined constant cycle period.

5. A method of controlling the speed of a DC motor in a pressure modulator a variable load, the method comprising the steps of:
   applying a voltage to the motor for an application time period varying in an inverse relationship to motor acceleration;
   terminating the applied voltage to the motor for a wait period varying in a direct relationship to motor acceleration; and
   cyclically repeating the steps of applying and terminating.

6. The method of claim 5 wherein the sum of the application time period and wait period is equal to a constant predetermined cycle time.

7. The method of claim 5 wherein motor acceleration is determined from the rate of change in motor current, the rate of change in motor current being dependent upon motor load.

8. A method of rehoming a pressure modulator having a piston linearly moved by a DC motor for modulating a pressure, the pressure modulator having a home position whereat the piston is at an extended limit of travel, the method comprising the steps of:
   determining the motor stall current;
   cyclically at constant cycle time intervals (a) applying a voltage to the motor, the motor current increasing to above a predetermined offset below the stall current and thereafter decreasing as motor speed increases and (b) terminating the applied motor voltage for the remainder of the cycle time interval after the motor current decreases to the predetermined offset below the stall current; and
   terminating the cyclic application and termination of the applied voltage when the motor current remains above the predetermined offset below the stall current for a predetermined rehome time period representing the minimum time period required for the piston to be moved to the extended limit of travel.

* * * * *